(12) United States Patent
Kwasny

(10) Patent No.: US 7,261,440 B2
(45) Date of Patent: Aug. 28, 2007

(54) AXIS SYMMETRIC SPECULAR REFLECTOR

(75) Inventor: Joel D. Kwasny, Romeoville, IL (US)

(73) Assignee: Honeywell International, Inc., Morristown, NJ (US)

( * ) Notice: Subject to any disclaimer, the term of this patent is extended or adjusted under 35 U.S.C. 154(b) by 186 days.

(21) Appl. No.: 11/095,105

(22) Filed: Mar. 31, 2005

(65) Prior Publication Data

US 2006/0221616 A1 Oct. 5, 2006

(51) Int. Cl.
*F21V 7/06* (2006.01)

(52) U.S. Cl. .................. 362/297; 362/346; 362/517; 362/347

(58) Field of Classification Search ............... 362/297, 362/517, 518, 346, 348, 347, 350, 811; 359/546, 359/853

See application file for complete search history.

(56) References Cited

U.S. PATENT DOCUMENTS

| | | | | |
|---|---|---|---|---|
| 4,953,063 A | * | 8/1990 | Nino | 362/539 |
| 4,954,938 A | * | 9/1990 | Lyons | 362/298 |
| 5,622,427 A | | 4/1997 | Lemons et al. | 362/300 |
| 5,865,527 A | | 2/1999 | Lemons et al. | 362/298 |
| 5,931,569 A | | 8/1999 | Anderson | 362/346 |
| 6,343,872 B1 | * | 2/2002 | Cerone et al. | 362/297 |
| 6,623,143 B2 | | 9/2003 | Anderson | 362/297 |
| 6,793,375 B2 | | 9/2004 | Anderson | 362/304 |
| 7,128,446 B2 | * | 10/2006 | Vanden Eynden | 362/346 |

* cited by examiner

*Primary Examiner*—Thomas M. Sember
(74) *Attorney, Agent, or Firm*—Welsh & Katz, Ltd

(57) ABSTRACT

A strobe unit includes a light source and a reflector. The reflector incorporates a plurality of reflecting regions arranged symmetrically about the source. Each of the reflecting regions incorporates a partial parabolic section which extends arcuately in a plane perpendicular to an axis of the light source on the order of forty-five degrees. Such arcuately extending surfaces are displaced from one another on the order of forty-five degrees.

26 Claims, 19 Drawing Sheets

AXIS SYMMETRIC SPECULAR REFLECTOR

FIELD OF THE INVENTION

The invention pertains to reflectors and strobe units of a type that might be used in fire detection systems to provide visual warnings of alarm conditions. More particularly, the invention pertains to such reflectors and strobe units with symmetrical structures which are mountable on either vertical or horizontal surfaces.

BACKGROUND

A variety of reflector and strobe light structures are known and used as warning devices in connection with fire detection systems. Representative of these are reflectors and strobe units disclosed in U.S. Pat. No. 5,931,569 to Anderson entitled "Reflector with Strobe Light Extending Therefrom", U.S. Pat. No. 6,793,375 to Anderson entitled "Reflector with Complex Paraboloid Surface with Elongated Light Source" and U.S. Pat. No. 6,623,143 B2 to Anderson entitled "Ceiling Reflectors". The above noted patents are assigned to the assignee hereof and incorporated herein by reference.

The '143 patent discloses a reflector particularly suited for ceiling mounting. The reflector of the '143 patent is symmetrical about a central axis. A disclosed embodiment incorporates four identical reflector modules arranged around the line of symmetry.

While the above noted reflectors have been found to be effective in carrying out their intended purposes, there continues to be a need for versatile reflector structures which can with a single unit fulfill agency requirements for both ceiling mounted and wall mounted units at various candela outputs. Preferably the agency requirements can be met with less input power per unit so as to be able to increase the number of units present on a given notification device loop.

DETAILED DESCRIPTION OF THE PREFERRED EMBODIMENT

Figure 1:
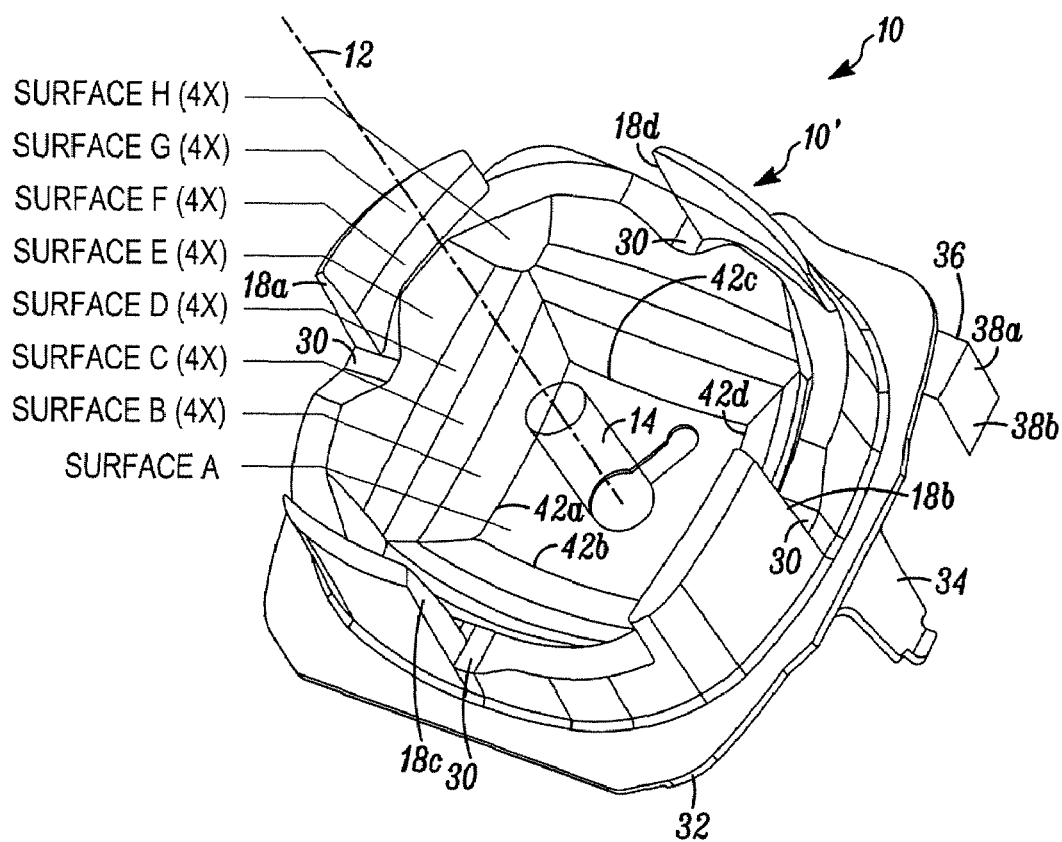
FIG. 1 is an overall perspective type view of a strobe unit incorporating a reflector in accordance with the present invention.

While this invention is susceptible of an embodiment in many different forms, there are shown in the drawing and will be described herein in detail specific embodiments thereof with the understanding that the present disclosure is to be considered as an exemplification of the principals of the invention. It is not intended to limit the invention to the specific illustrated embodiments.

A reflector which embodies the present invention incorporates a set of eight different reflective surfaces which are replicated and symmetric in each of four quadrants around a common central axis. The central axis extends through an elongated light source.

The surfaces in each quadrant are implemented with varying focal lengths and aiming directions. They are focused about a common focal point located at or about the center of the source.

In a disclosed embodiment the required light intensity from the light source needed to meet agency light output requirements is on the order of 25% or less of rated light output. This efficiency translates into lesser power requirements on a per unit basis.

The light source can be implemented as an elongated cylindrical gas discharge tube. For example, a xenon flash tube can be incorporated into the reflectors of the present invention. A center of the arc gap, in such an implementation, is located at the focal point of all the reflecting surfaces.

In yet another aspect of the invention, a visible notification appliance in accordance with the present invention can incorporate a plurality of spaced apart surfaces to distribute light along planes at an angle of 45 degrees to the central axis. Such surfaces contribute approximately 50% of the total light viewed along those planes. The remaining 50% is contributed directly by the source.

Another reflector which embodies the present invention incorporates a plurality of concentric parabolic curves symmetrically distributed about an axis of the source. Each of the curves expands at an angle outwardly from the axis of the source starting from a proximal end of the source adjacent to the reflector. Each of the members of the plurality is displaced further laterally from the axis of the source in a direction along the axis toward the distal end of the source.

In a further aspect of the invention, an additional partial parabolic curved reflector can be associated with each of the quadrants extending from the most distally located member of the plurality. The subject surface is revolved along an axis rotated a predetermined amount about the common focal point of the reflector.

In yet another aspect of the invention, two additional partial parabolic curves extend axially from the above noted surface generally in a distal direction along the axis of the bulb. The respective partial paraboloid is rotated on the order of 45 degrees defining a plane which is perpendicular to the axis of the bulb.

A strobe unit usable as a visual notification appliance in a fire detection system, and which embodies the present invention includes a base. The base carries an elongated source that axially extends along a line of symmetry of an adjacent reflector. The reflector incorporates a plurality of substantially identical reflective elements. For example, four reflective elements can each extend across a ninety degree region and surround the source.

The base can be mounted on either a horizontal surface, such as a ceiling, or a vertical surface, such as a wall. The unit, in one embodiment can include circuitry for reception of electrical energy from a displaced source and for charging a capacitor. The capacitor is in turn discharged to illuminate the source.

FIG. 1 illustrates an overall view of a reflector system 10, incorporatable into a strobe unit, in accordance with the invention. The system 10 creates a light intensity profile which exceeds UL 1971 output requirements for both wall and ceiling applications including the ADA15-75 requirement for intensity ratings between 15 candela and 185 candela. The reflector system 10 incorporates a reflector 10' which has a plurality of partial parabolic surfaces identified as A through H in FIG. 1. The surfaces A . . . H are symmetric relative to a central line 12. An elongated source 14 extends symmetrically along the center line 12.

Figure 2:
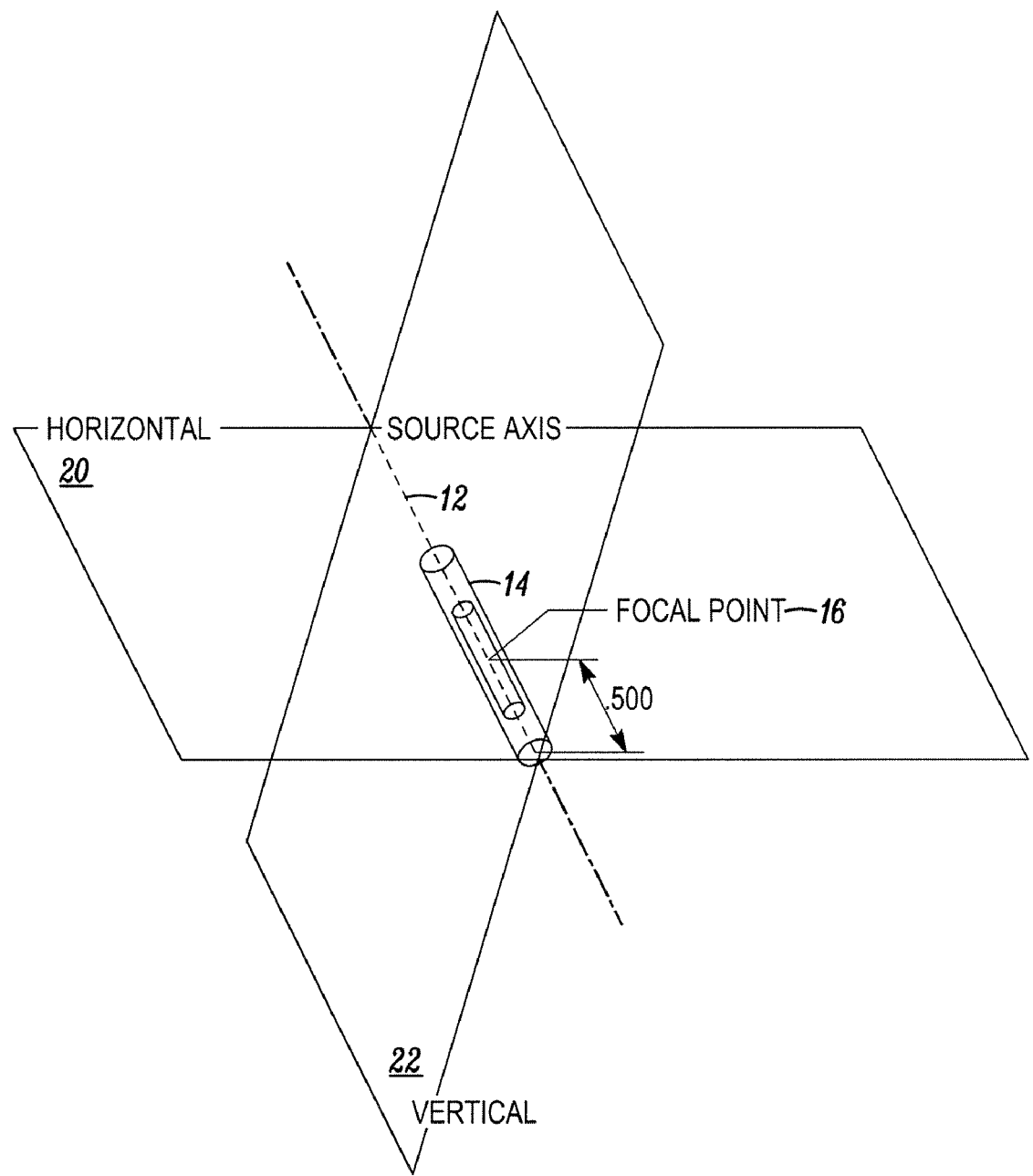
FIG. 2 illustrates a relationship between horizontal and vertical illumination planes and an axis of the source of illumination of the unit of FIG. 1.

The surfaces A . . . H have varying focal lengths in aiming directions as described in more detail subsequently. They are focused around a common focal point 16 which is located at the center of the source 14, best seen in FIG. 2. As those of skill in the art will understand, the optical emissions from reflector system 10 are in part measured relative to predetermined horizontal and vertical planes, such as planes 20 and 22.

The planes 20 and 22 are orthogonal to one another and intersect on the axis of symmetry 12. In a wall mountable configuration, the axis 12 of source 14 extends generally perpendicular to the wall. The associated horizontal and vertical planes, such as 20, 22 extend substantially parallel to surface pairs 18a, b and 18c, d.

The surfaces A . . . E as illustrated in FIG. 1 form a stacked plurality of partial parabolic surfaces, each of which extends radially across a ninety degree angle measured relative to the axis 12. As noted above, the surfaces A . . . E are replicated for each quadrant around the axis 12. Each of the quadrants also includes stacked first and second partial parabolic surfaces F and G which extend generally parallel to the axis 12. The surfaces F and G extend radially across an angle on the order of forty-five degrees in a plane perpendicular to axis 12.

Figure 10:
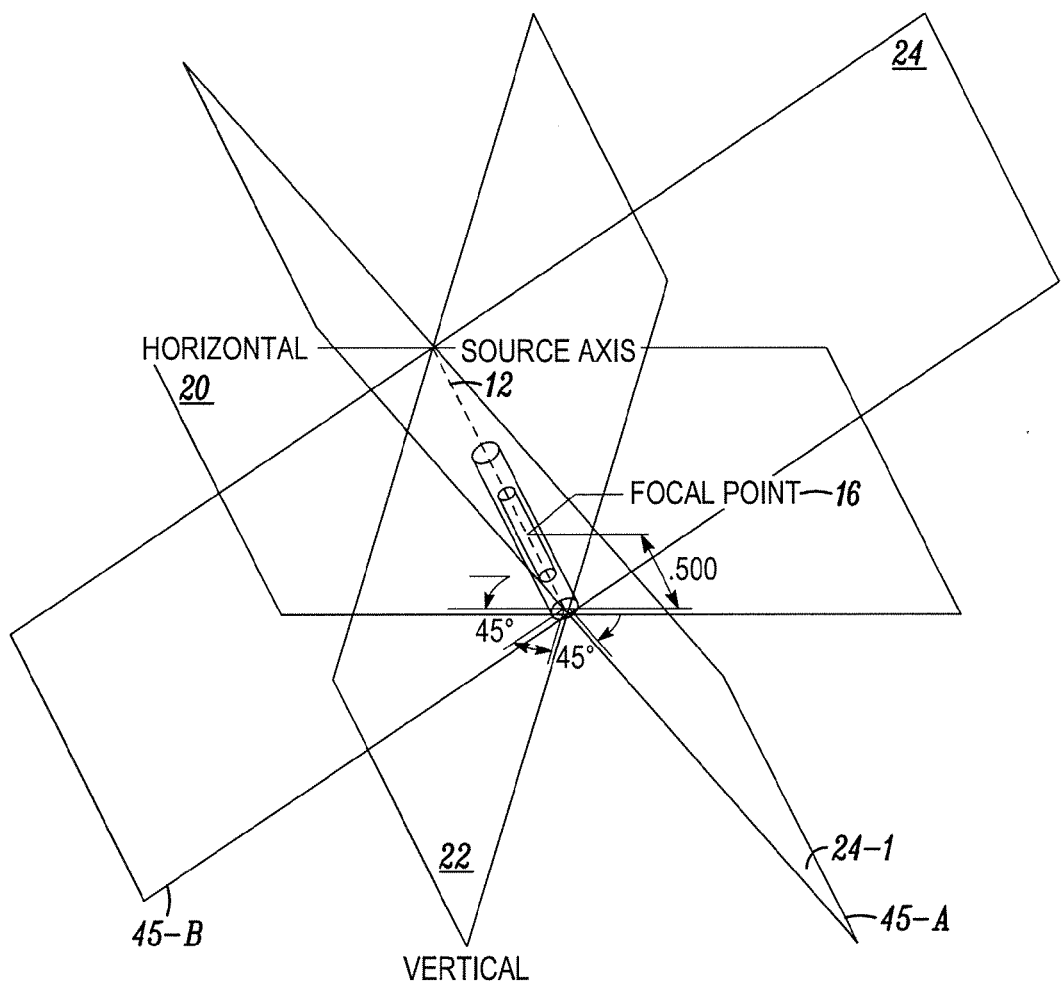
FIG. 10 illustrates a relationship of a forty-five degree plane relative to the horizontal and vertical planes of FIG. 2.

Finally, surfaces H, which contribute light to a plane 24 which extends through the source axis 12 and is rotated forty-five degrees relative to the planes 20 and 22, best seen in FIG. 10. The surfaces H are each bisected by ninety degree radial lines, extending in a plane perpendicular to the axis 12 which bound each of the quadrants which are formed by the surfaces A . . . H. As discussed in more detail subsequently, each of the quadrants carries a notch 30 formed in a portion of respective surface E.

As illustrated in FIG. 1 reflector 10' is formed of a plurality of four substantially identical reflector quadrants. Each quadrant extends across a ninety degree angle, formed in a plane perpendicular to the axis 12.

The reflector 10' can be formed with a molded plastic body 32 which is plated by vacuum deposition or the like. The body 32 can include one or more molded mounting tabs 34. The tabs 34 can be used to mount the reflector 10' on a printed circuit board 36 all without limitation.

The printed circuit board 36 can carry control circuitry and drive electronics 38a, b which can be used to couple electrical energy to the source 14 as would be understood by those of skill in the art. The system 10 can emit flashes of light from tube 14 as will be understood by those of skill in the art.

Figure 3:
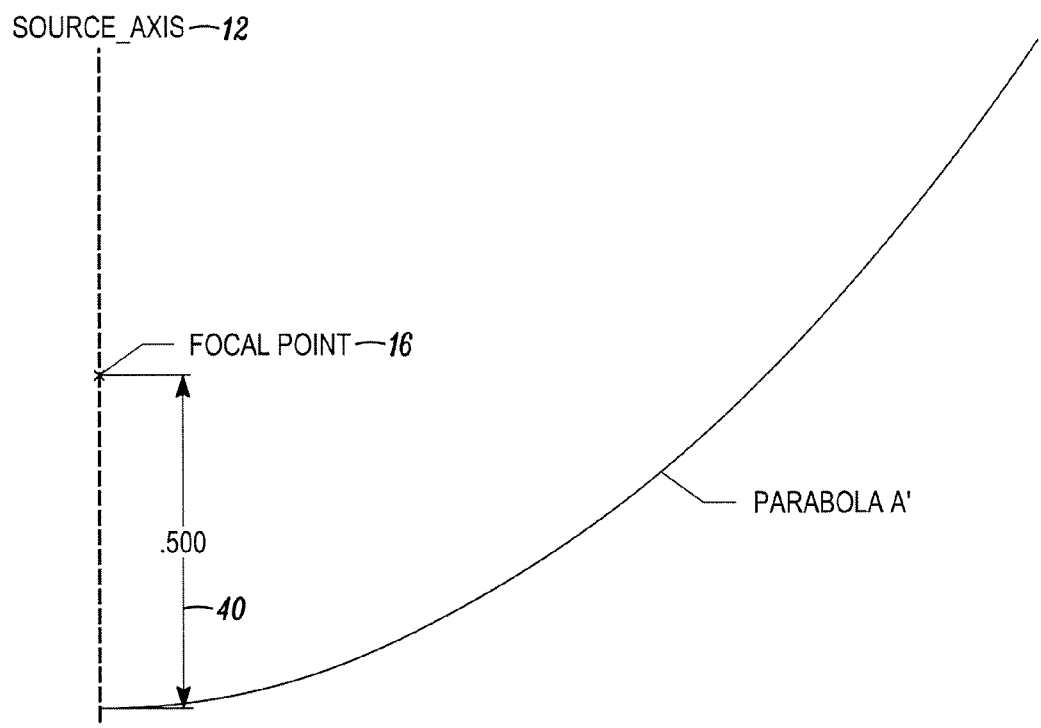
FIG. 3 illustrates details of the structure of surface A of the reflector of FIG. 1.

As illustrated in FIG. 3, surface A can be formed of a portion of a parabola A' defined on the horizontal plane having a predetermined focal length 40 having a preferred length on the order of 0.5 inches. The parabola A' is revolved around the source axis 12 through each of the four quadrants to form surface A. Those of skill in the art will understand that surfaces B truncate surface A along their common lines, such as 42a, b, c, d illustrated in FIG. 1. The surfaces B, C, D, are also terminated along respective common lines as illustrated in FIG. 1.

Figure 4:
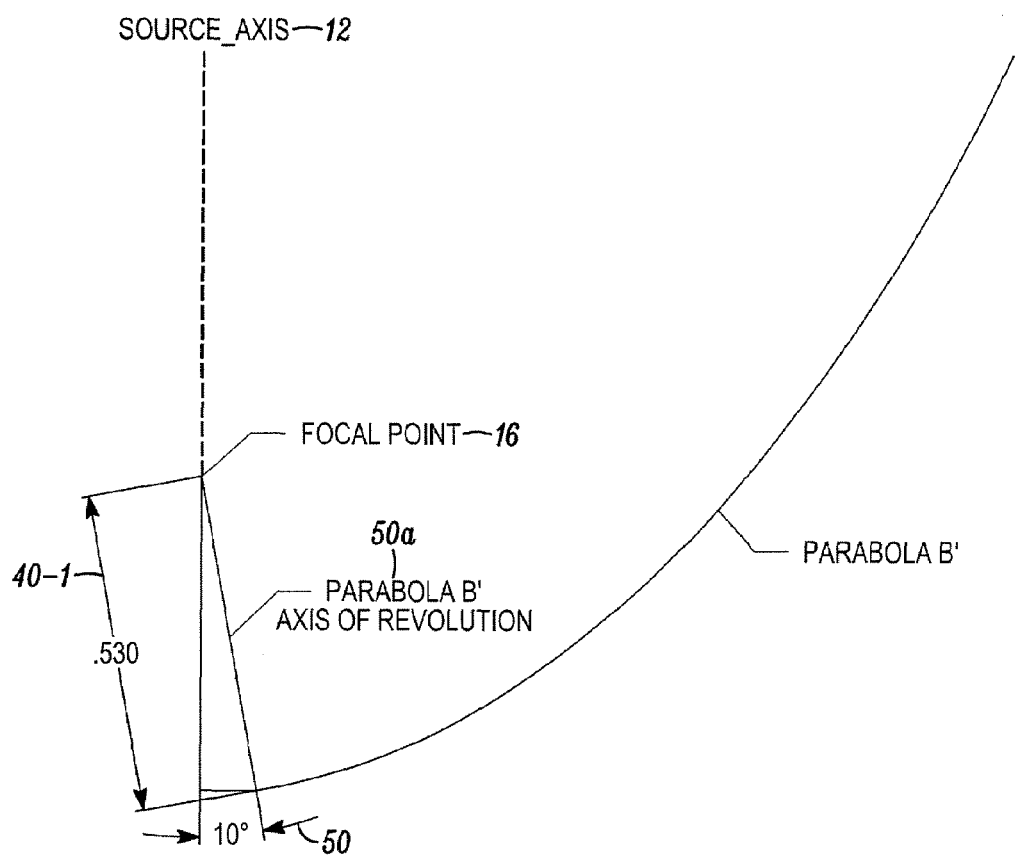
FIG. 4 illustrates details of the surface B of the reflector of FIG. 1.

As illustrated in FIG. 4, parabola B' is used to form the surfaces B in each of the four quadrants. Parabola B' is defined on the horizontal plane 20 and has a predetermined focal length 40-1, preferably on the order of 0.530 inches. An axis of revolution 50a of parabola B' is rotated through a predetermined angle 50 preferably on the order of ten degrees prior to parabola B' being revolved around that axis to form the surface B.

Figure 5:
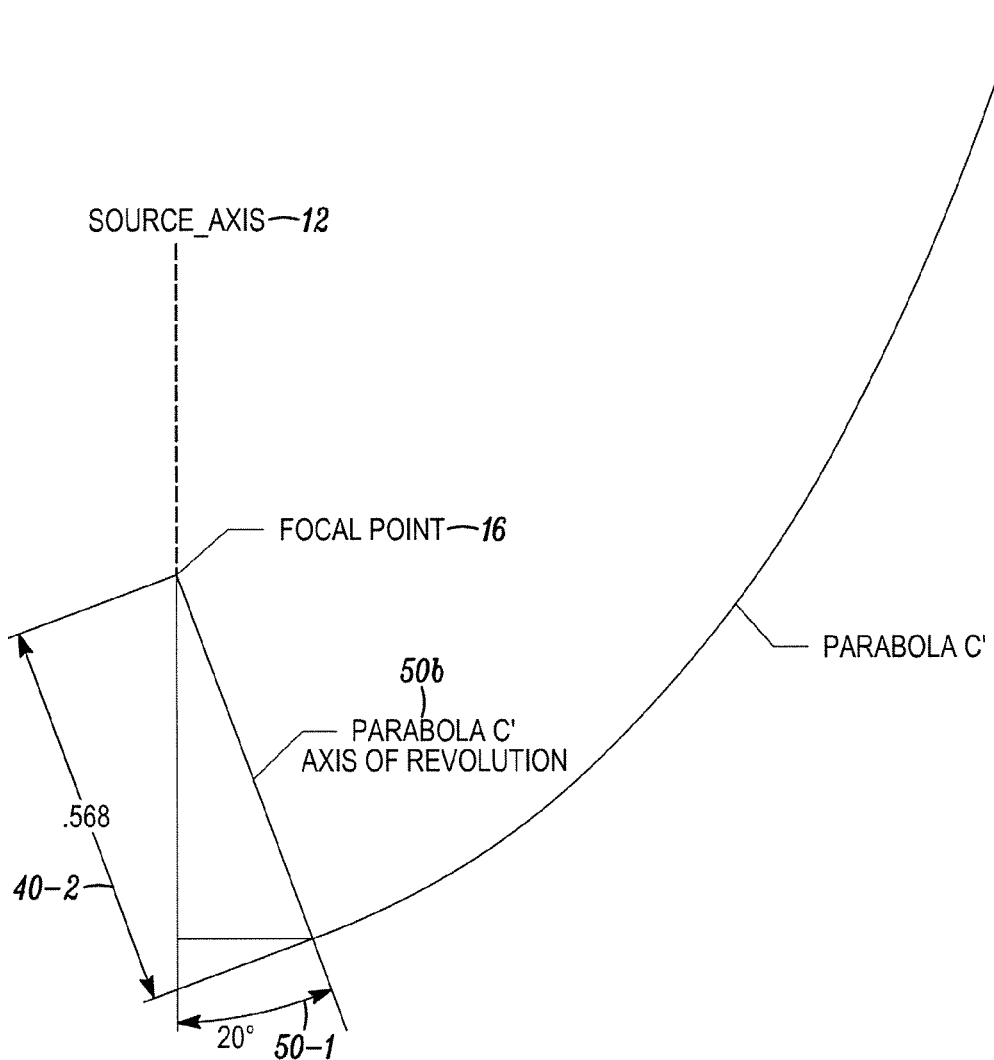
FIG. 5 illustrates details of the surface C of the reflector of FIG. 1.

Parabola C' illustrated in FIG. 5, can be used to form the truncated partial parabolic surfaces C in each of the four quadrants. The parabola C' is defined on the horizontal plane 20 with a focal length 40-2 preferably on the order of 0.568 inches. An axis of revolution 50b for parabola C' is rotated through an angle 50-1 preferably on the order of twenty degrees. The parabola C' is then revolved around the displaced axis of revolution 50b to form the truncated partial parabolic surfaces C in each of the four quadrants.

Figure 6:
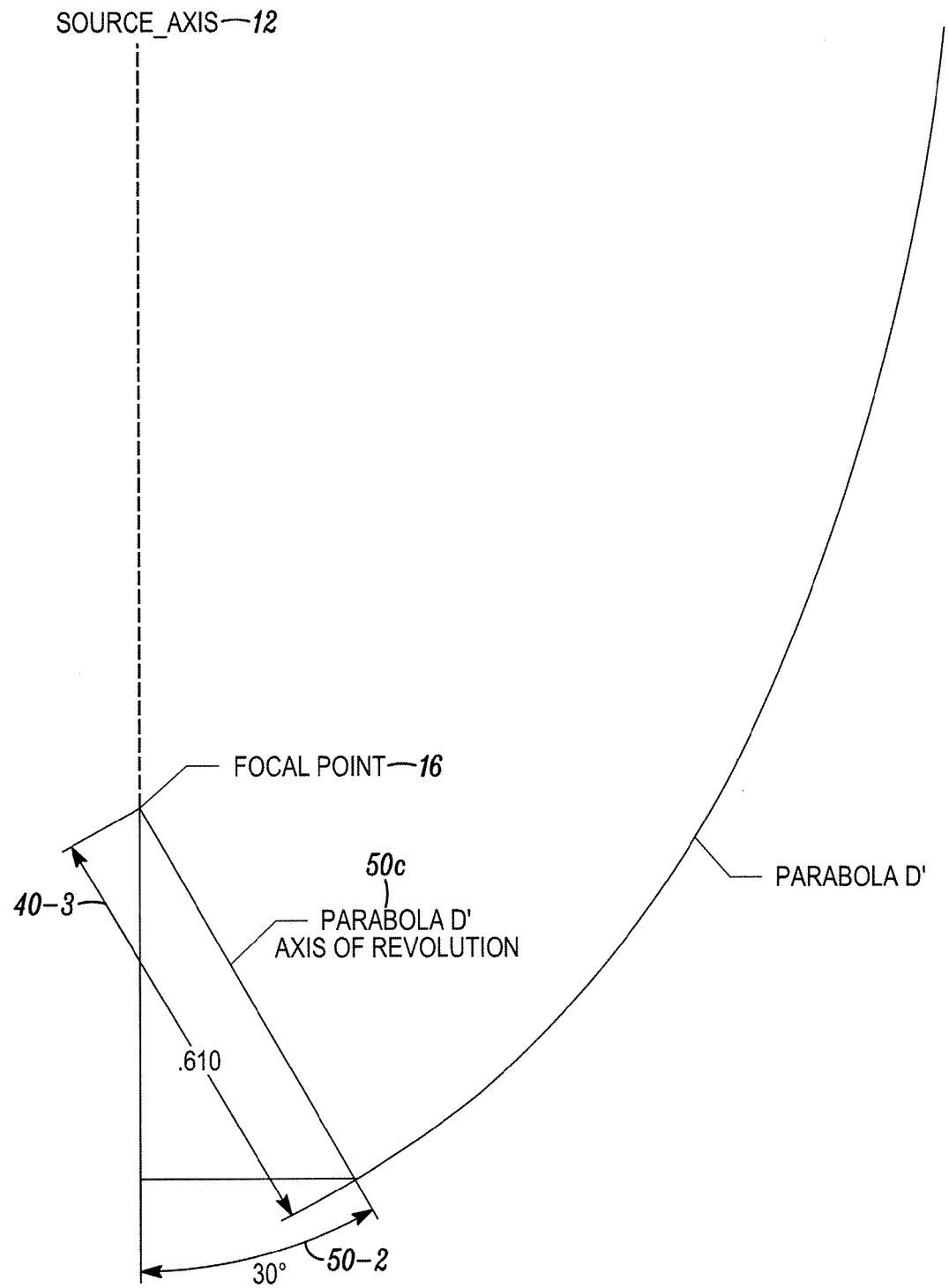
FIG. 6 illustrates details of the surface D of the reflector of FIG. 1.

As illustrated in FIG. 6, parabola D' is used to form the truncated partial parabolic surfaces D. The parabola D' is defined on the horizontal plane 20 with a predetermined focal length 40-3, preferably on the order of 0.610 inches. An axis of revolution 50c of the parabola D' is rotated through an angle 50-2, preferably on the order of thirty degrees. The parabola D' is then revolved around its axis 50c to form the truncated partial parabolic surfaces D in each of the four quadrants.

Figure 7:
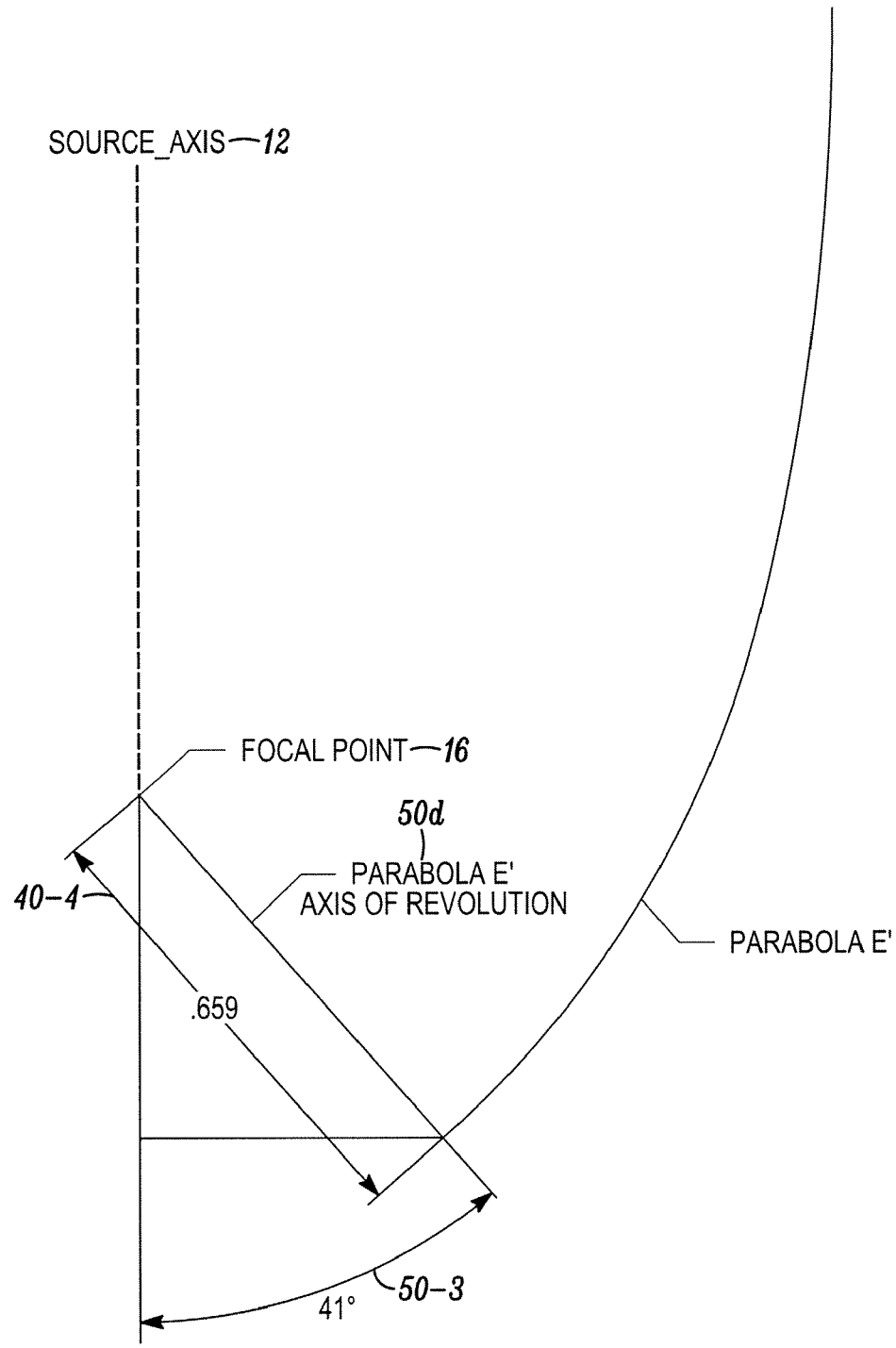
FIG. 7 illustrates details of the surface E of the reflector of FIG. 1.

As illustrated in FIG. 7, parabola E' is used to form the partial parabolic surfaces E which extends across each of the four quadrants of reflector 10'. Parabola E' is defined with a predetermined focal length 40-4, preferably on the order of 0.659 inches an axis of rotation 50d of parabola E' is rotated through an angle 50-3, preferably on the order of forty-one degrees. The parabola E' is then revolved about its axis of revolution 50d through each of the four quadrants thereby forming the truncated parabolic surfaces E in each of the four quadrants.

Figure 8:
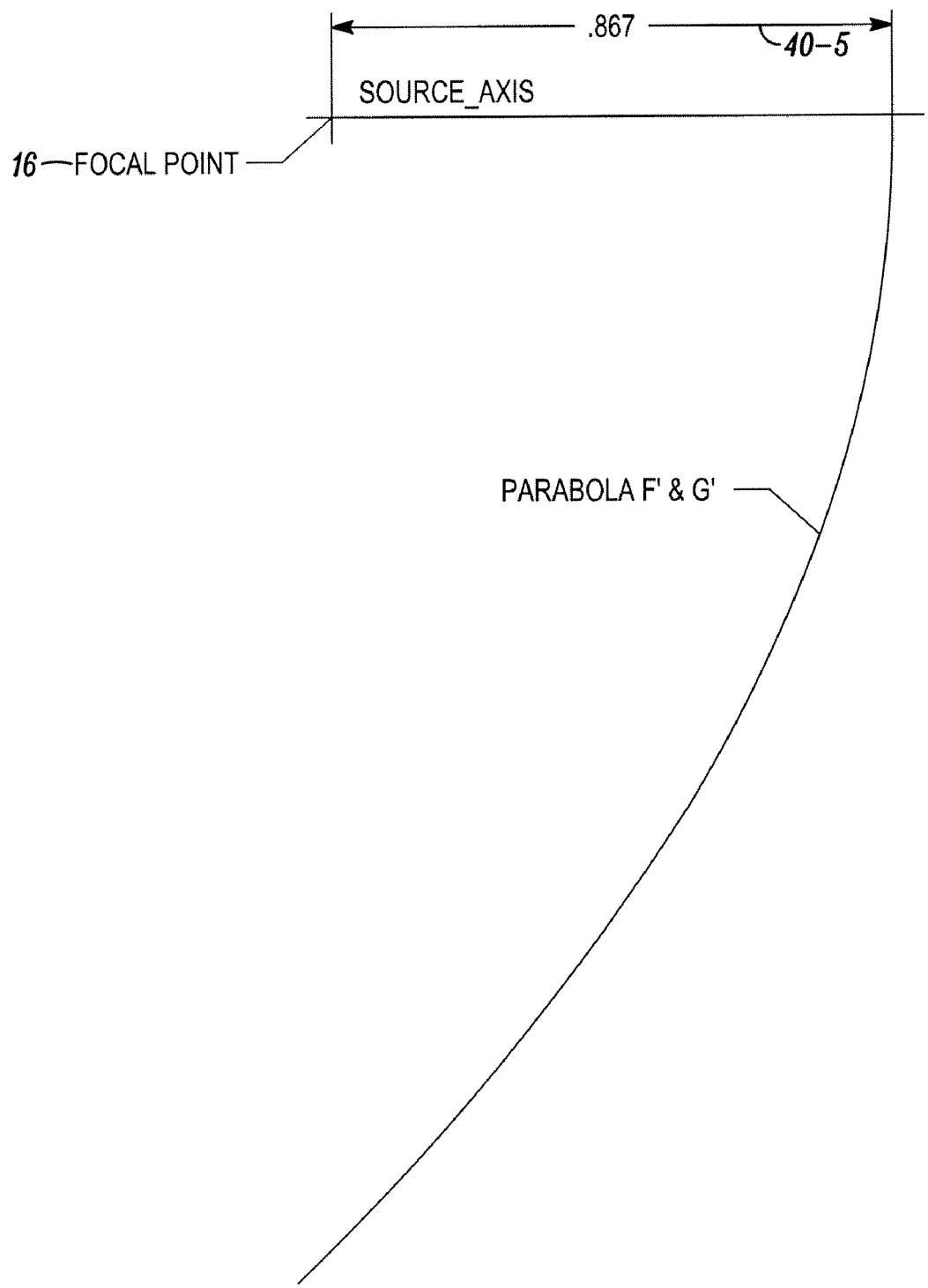
FIG. 8 illustrates details of the surfaces F and G of the reflector of FIG. 1.
Figure 9:
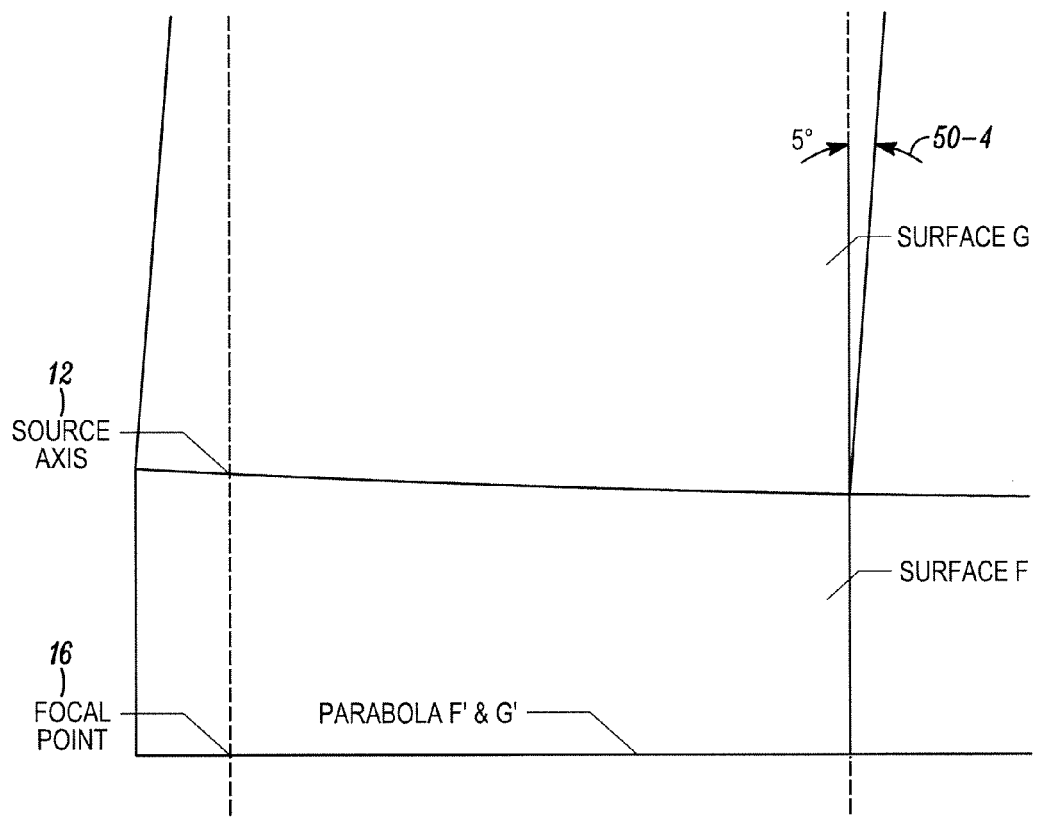
FIG. 9 illustrates additional details of the relationship between surfaces F and G of the reflector of FIG. 1.

FIGS. 8 and 9 illustrate formation of the stacked partial parabolic surfaces F and G. The surfaces F and G are defined in a plane to which the axis of symmetry 12 is orthogonal. The parabola F' and G' is formed with a predetermined focal length 40-5 preferably on the order of 0.867 inches. The partial parabolic surface F is formed by extending the F' and G' parabola orthogonally relative to the axis of the source 12. The surface F which is formed extends arcuately through an angle on the order of forty-five degrees in a plane orthogonal to the axis 12.

The surface G which abuts distal end of the surface F is formed using the same F' and G' parabola. However, the surface G extends at a predetermined angle 50-4 preferably on the order of five degrees from a tangent to the surface F.

Figure 11:
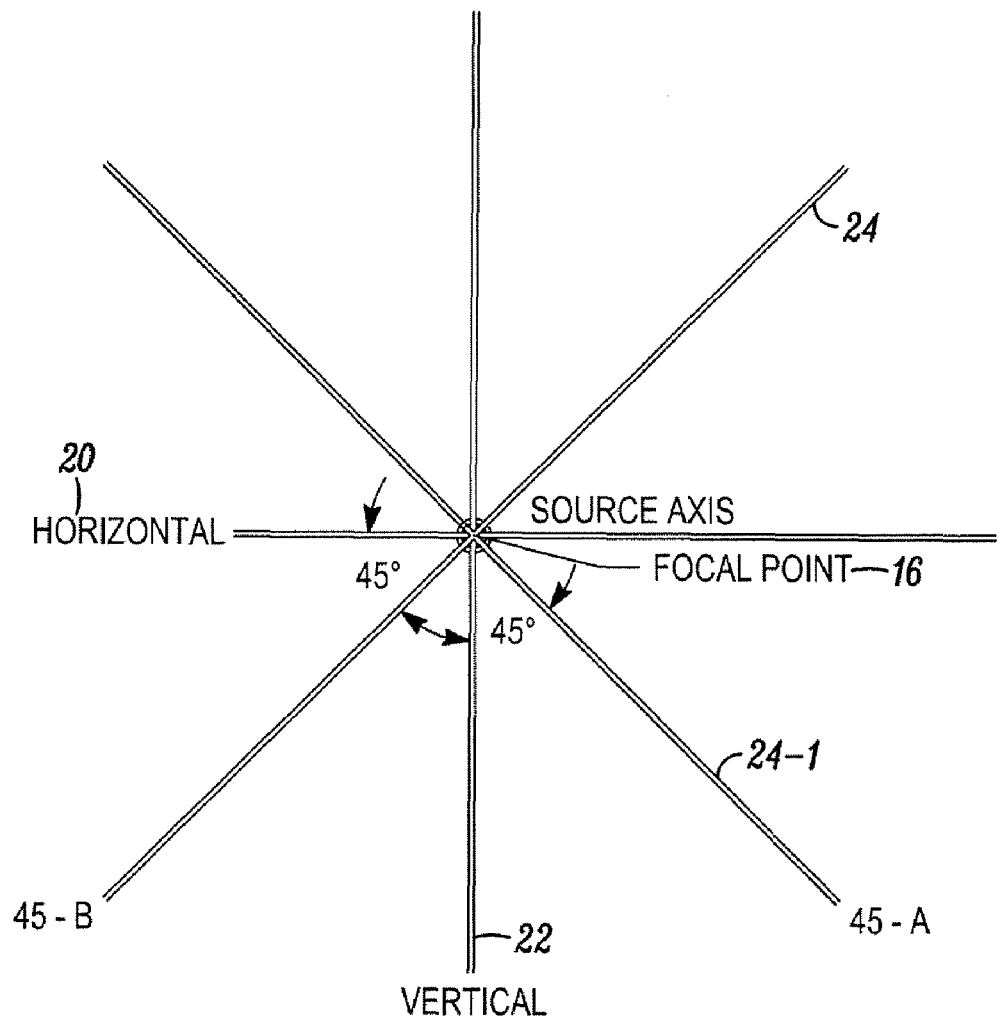
FIG. 11 is another view of the planes of FIG. 10.
Figure 12:
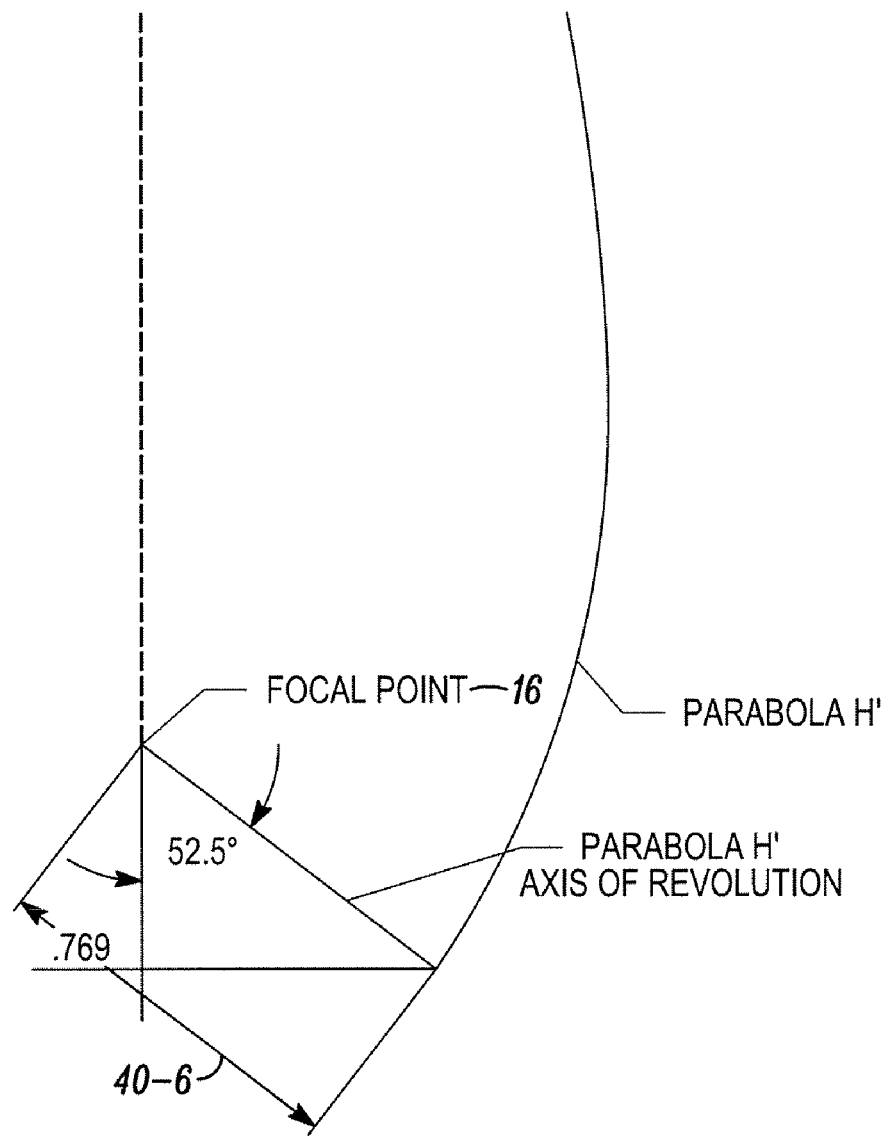
FIG. 12 illustrates details of the surface H of the reflector of FIG. 1.

Each of the surfaces H is formed, as illustrated in FIG. 10, on a plane 24 oriented at an angle of forty-five degrees relative to the planes 20, 22 and extending through the axis 12. With reference to FIGS. 11, 12, parabola H' is defined with a predetermined focal length 40-6 preferably on the order of 0.769 inches. The parabola H' is then revolved about an axis of rotation in an amount so as to form the truncated partially parabolic surface H in each quadrant. Each of the surfaces H is bisected by a quadrant defining radial extending in a plane perpendicular to the axis of symmetry 12.

It is a particular advantage of the reflector system 10 that it creates continuously, smooth light output profiles without exhibiting peaks and valleys. This results in increased control over light output and also efficiency. These results have been achieved in exemplary reflector system, such as the system 10, by incorporating a plurality of parabolas having varying focal lengths described above. Surfaces A . . . E are formed coplanar and are revolved around varying aiming axes. Output light is directed primarily parallel in the direction of the axis of revolution. Offset angles of the various aiming axes, as would be understood by those of skill in the art, are determined by a required profile so as to create as efficient a design as possible.

Figure 13:
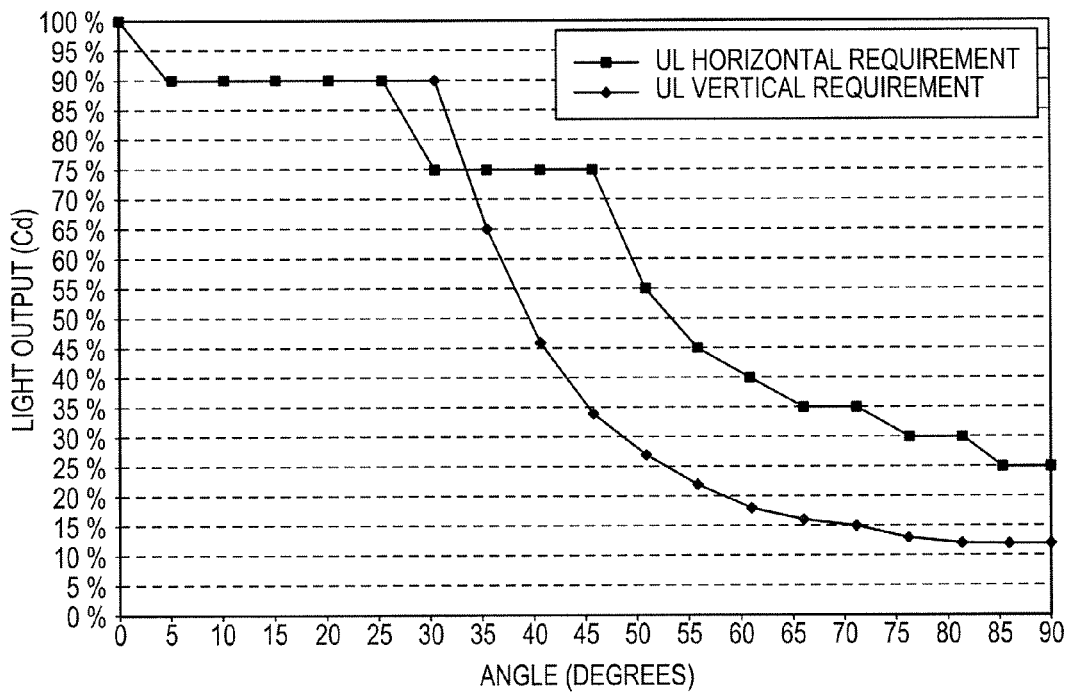
FIG. 13 is a graph of UL wall requirements as a function of angle.
Figure 14:
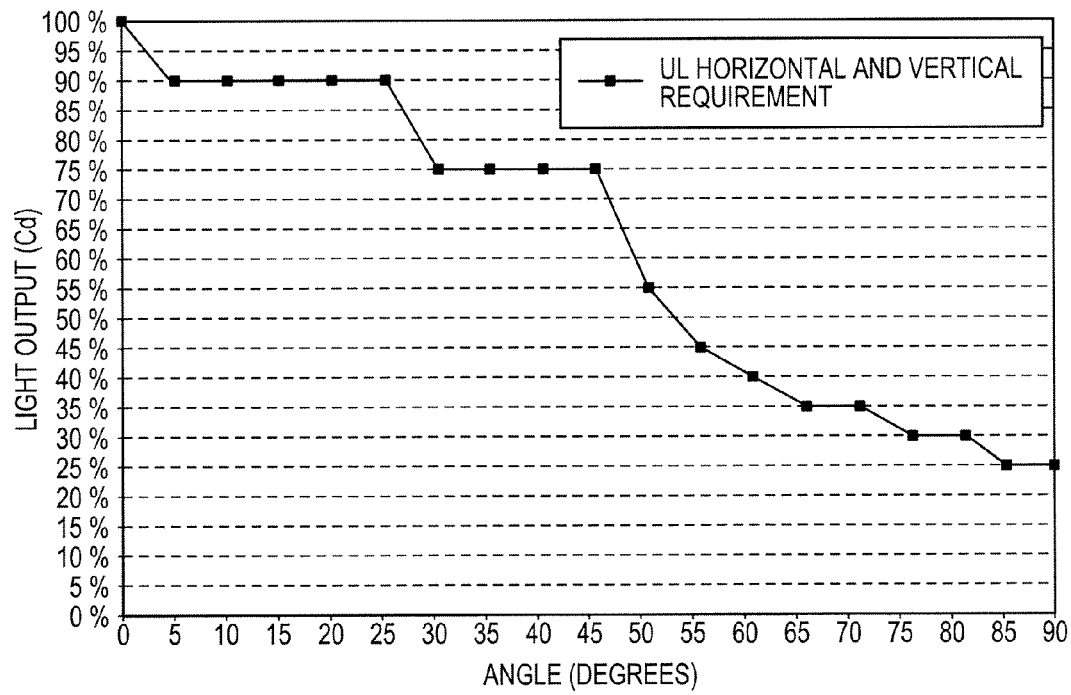
FIG. 14 is a graph of UL ceiling requirements as a function of angle.
Figure 15:
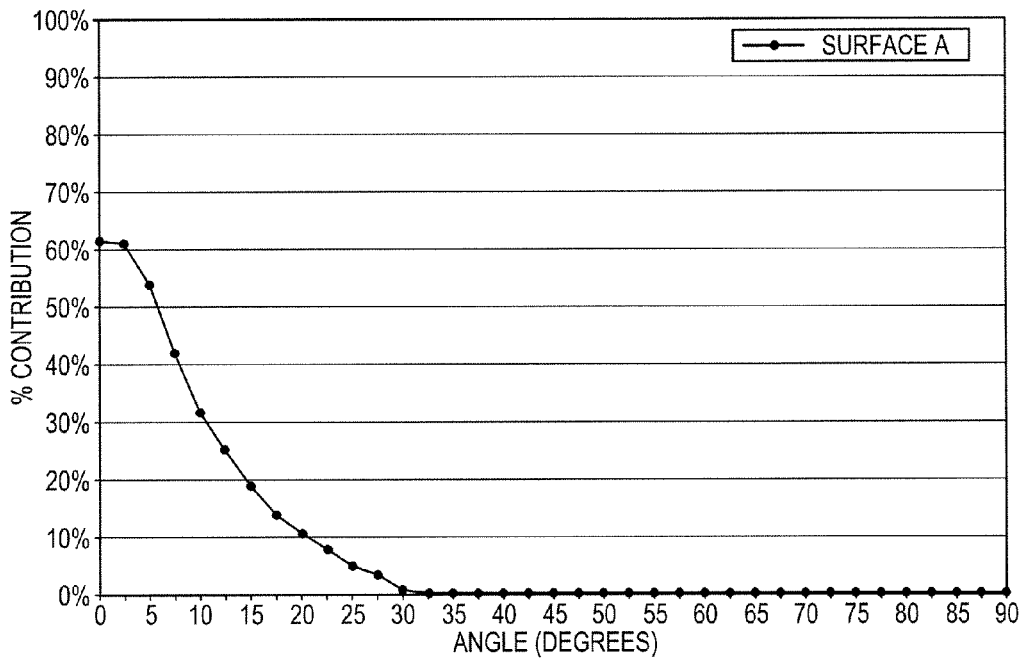
FIG. 15 is a graph illustrating contribution of applied output from surface A as a function of angle.
Figure 16:
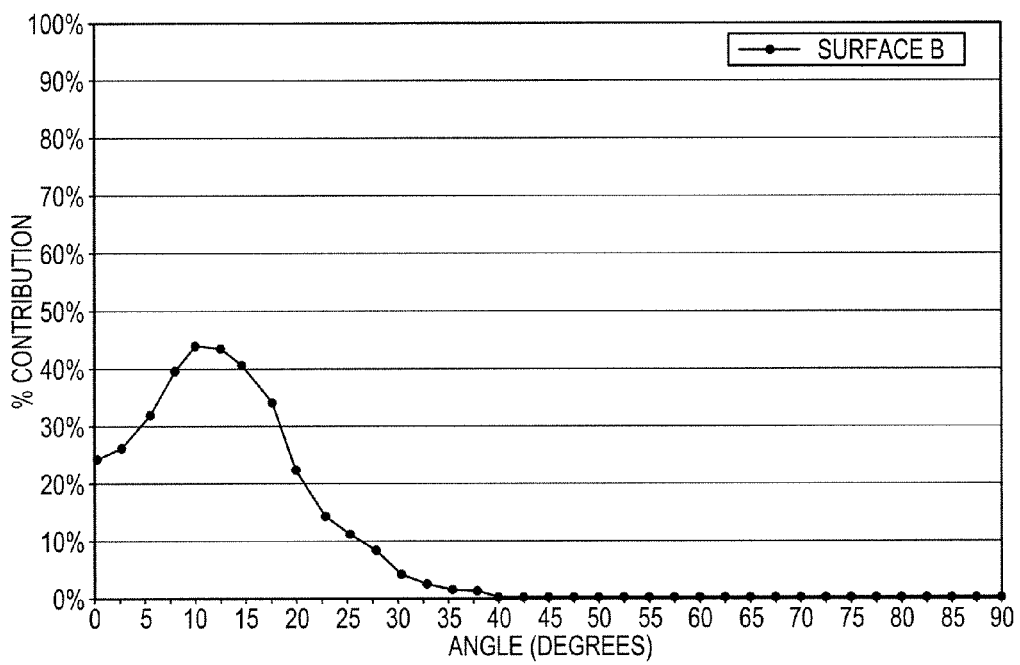
FIG. 16 is a graph illustrating contribution of light output from surface B as a function of angle.
Figure 17:
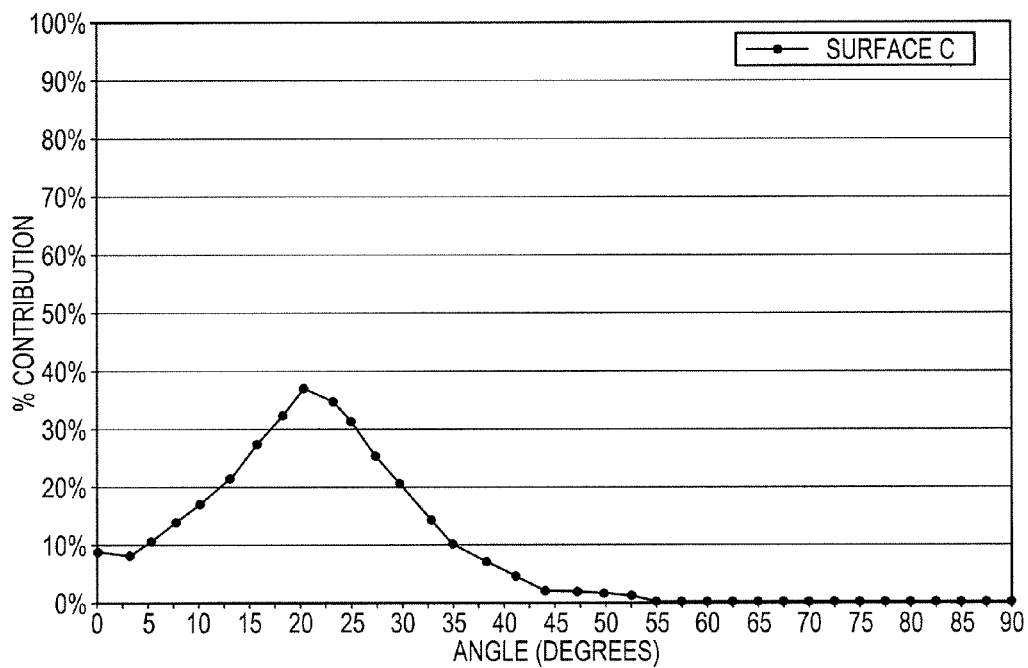
FIG. 17 is a graph illustrating contribution of light output from surface C as a function of angle.
Figure 18:
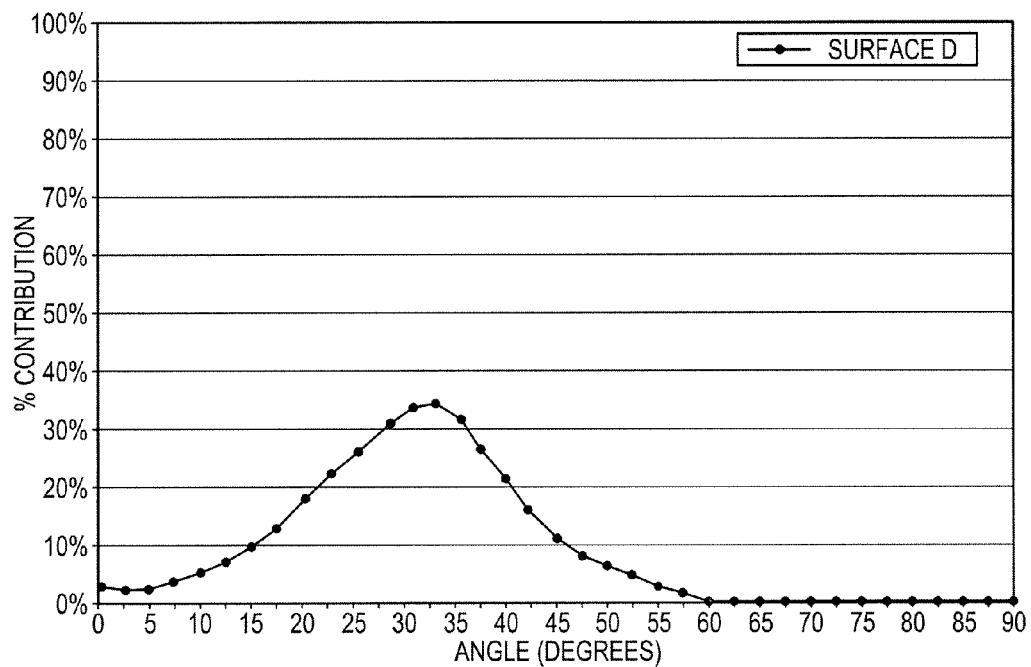
FIG. 18 is a graph illustrating contribution of light output from surface D as a function of angle.
Figure 19:
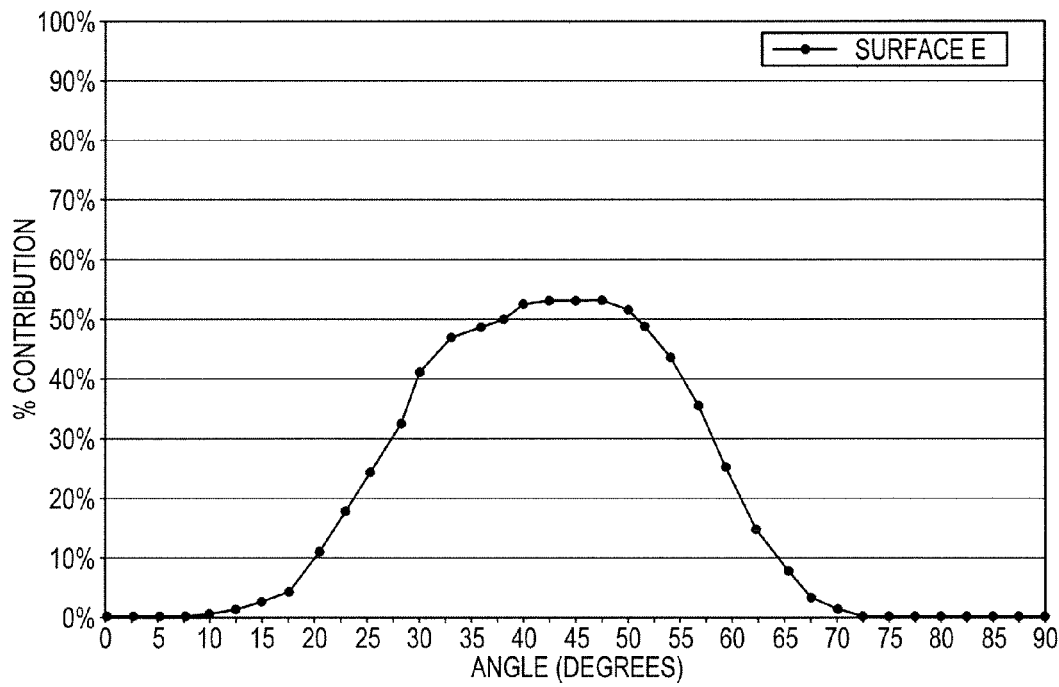
FIG. 19 is a graph illustrating contribution of light output from surface E as a function of angle.
Figure 20:
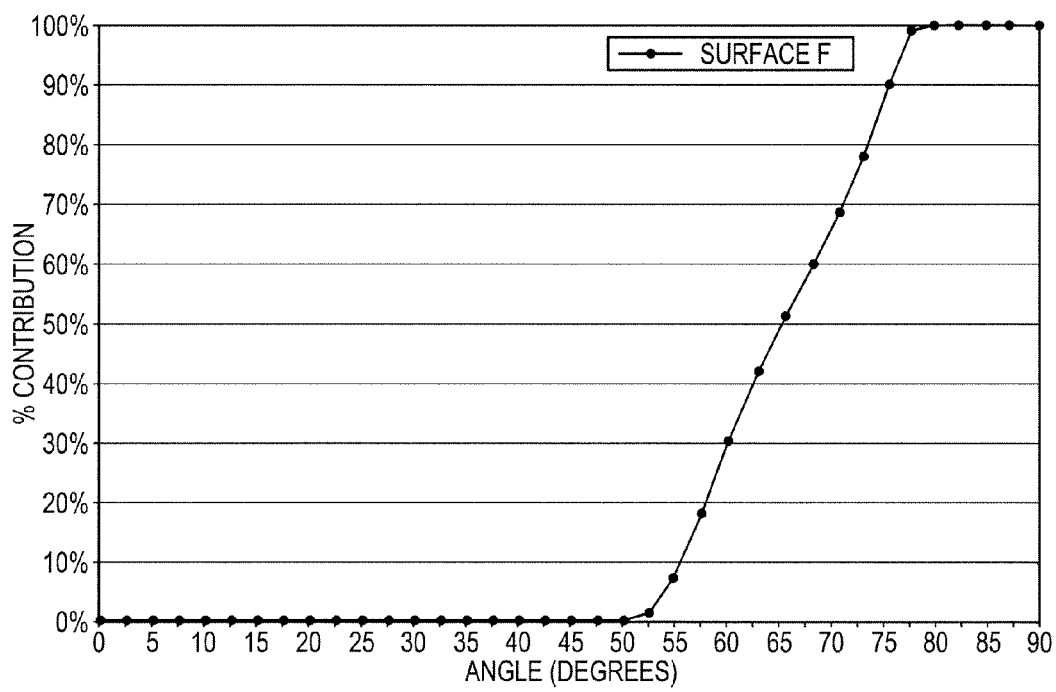
FIG. 20 is a graph illustrating contribution of light output from surface F as a function of angle.
Figure 21:
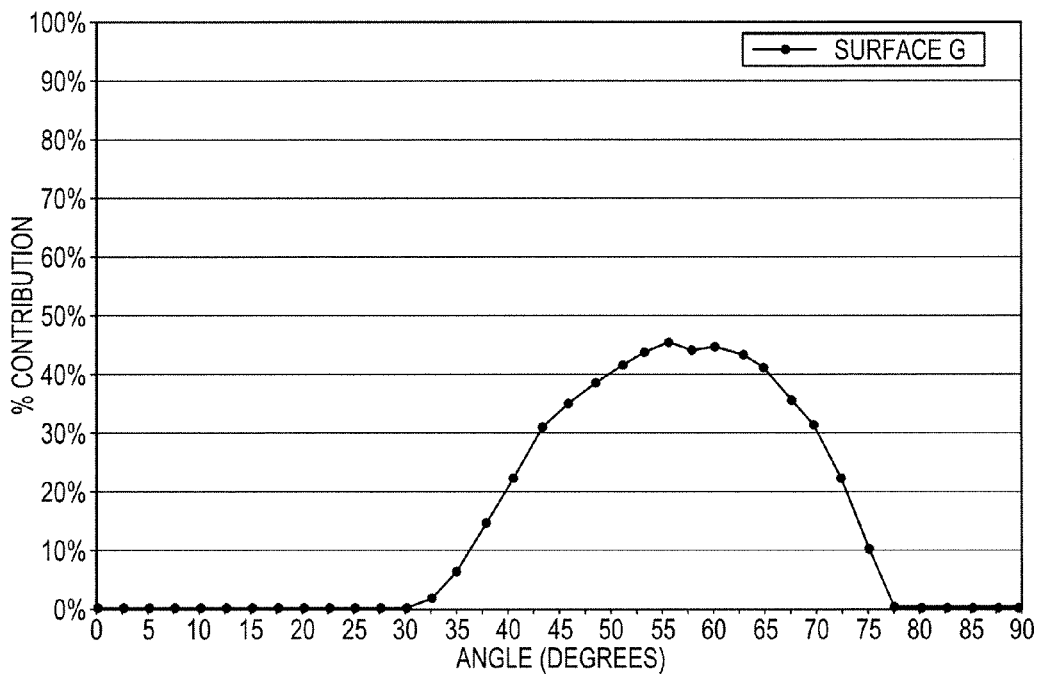
FIG. 21 is a graph illustrating contribution of light output from surface G as a function of angle.

FIG. 13 is a graph of UL 1971 light profile wall requirements for horizontal and vertical planes. Similarly, FIG. 14 is a graph of light output profile, as a function of angle, relative to an axis of the source for horizontal and vertical requirements for ceiling mounted reflectors.

Figure 23:
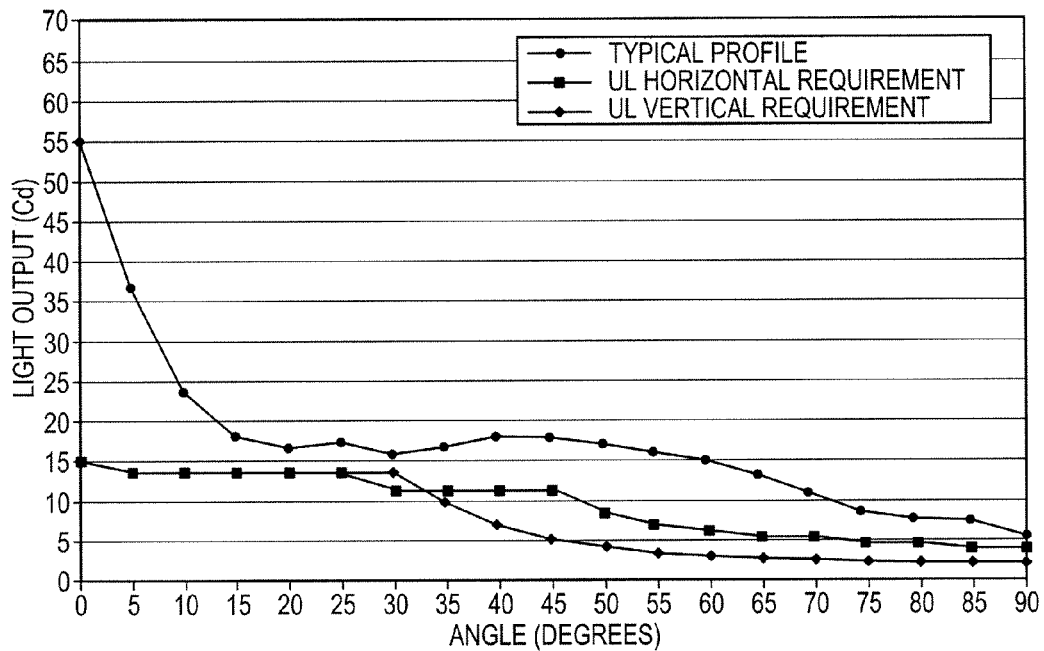
FIG. 23 is a comparison graph illustrating light output of an exemplary 15 Cd product in accordance with the invention relative to UL requirements.

Table 1a is a comparison of required outputs in horizontal and vertical planes between zero and ninety degrees as required by the profiles of FIG. 13 for a 15 Cd and 15/75 Cd output. The columns labeled "Typical 15 Cd output" and "Typical 15/75 Cd output" for both the horizontal plane and the vertical plane list the outputs at the indicated angles for an exemplary reflector, such as the reflector 10'. FIG. 23 presents the information of Table 1a graphically for a 15 Cd product, which incorporates the reflector 10' of system 10.

Figure 24:
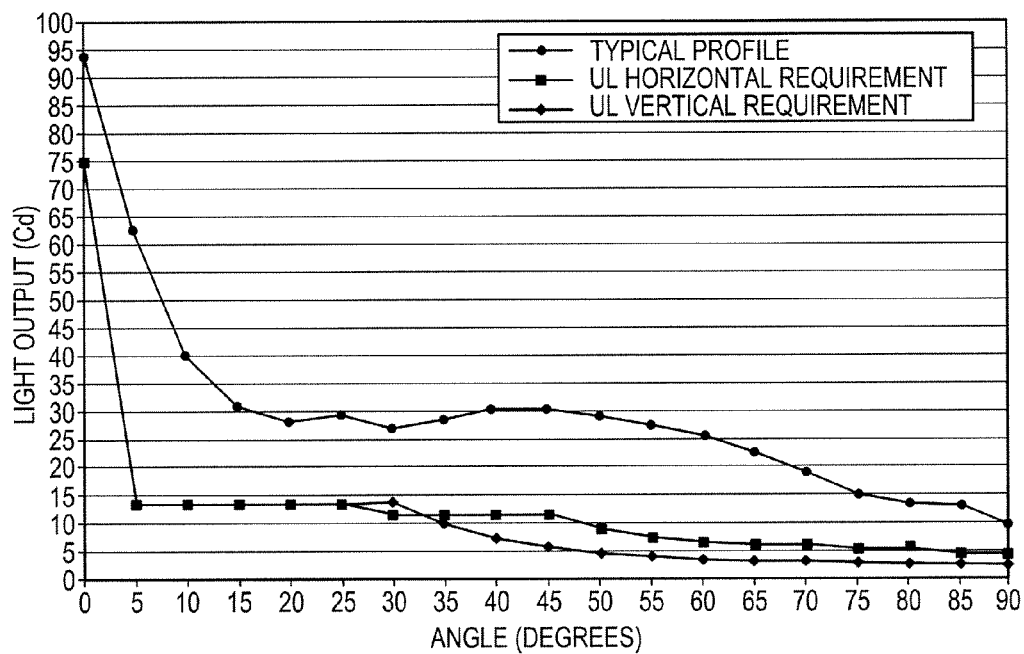
FIG. 24 is a comparative graph illustrating light output of a 15/75 Cd reflector system as in FIG. 1 as a function of angles and relative to UL requirements.

Table 1b presents in tabular form, UL ceiling reflector requirements in the horizontal and vertical plane for both a 15 Cd rated and 15/75 Cd rated reflector system. The outputs for reflector system 10 from Table 1b are illustrated graphically in FIG. 24 for 15/75 Cd rated products. FIGS. 23 and 24 illustrate graphically that the reflector system 10 produces a continuous light output profile which exceeds horizontal plane and vertical plane requirements for both 15 Cd rated type product, as well as 15/75 Cd rated product.

Figure 22:
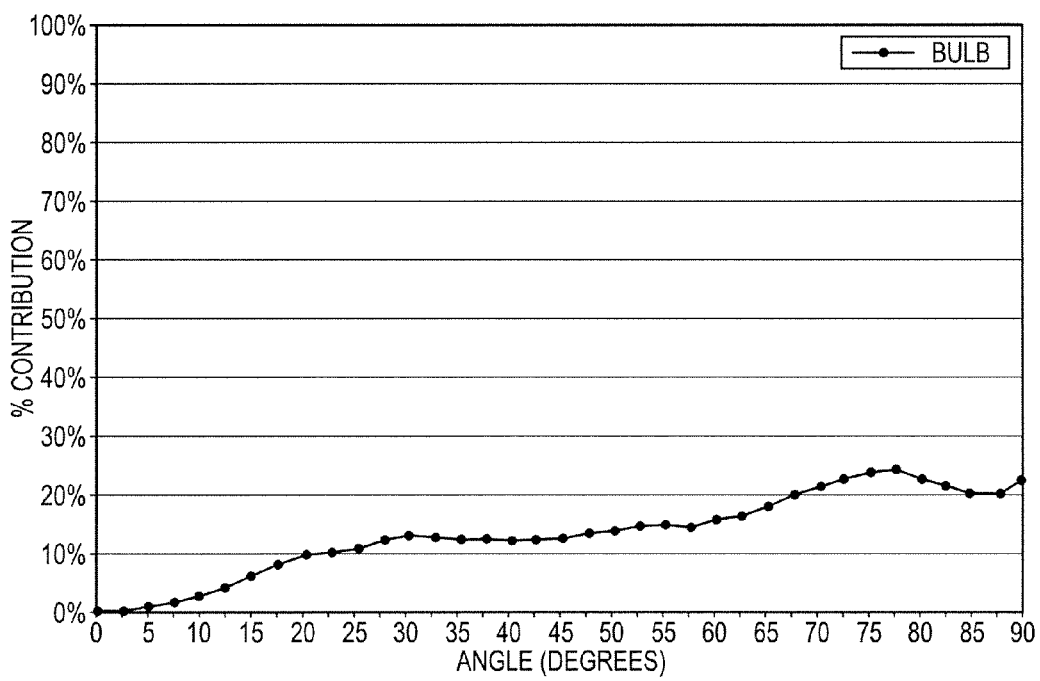
FIG. 22 is a graph illustrating contribution of direct rays from the source or bulb of a strobe unit as in FIG. 1 as a function of angle.

FIGS. 15-21 illustrate contributions of each of the respective surfaces A . . . G across a single quadrant. The graphs of FIGS. 15-21 are exclusive of direct rays from the source of illumination 14. Table 2 illustrates a surface contribution per quadrant in tabular form. FIG. 22 is a graph of contribution directly from the source 14 on a per quadrant basis.

Figure 25:
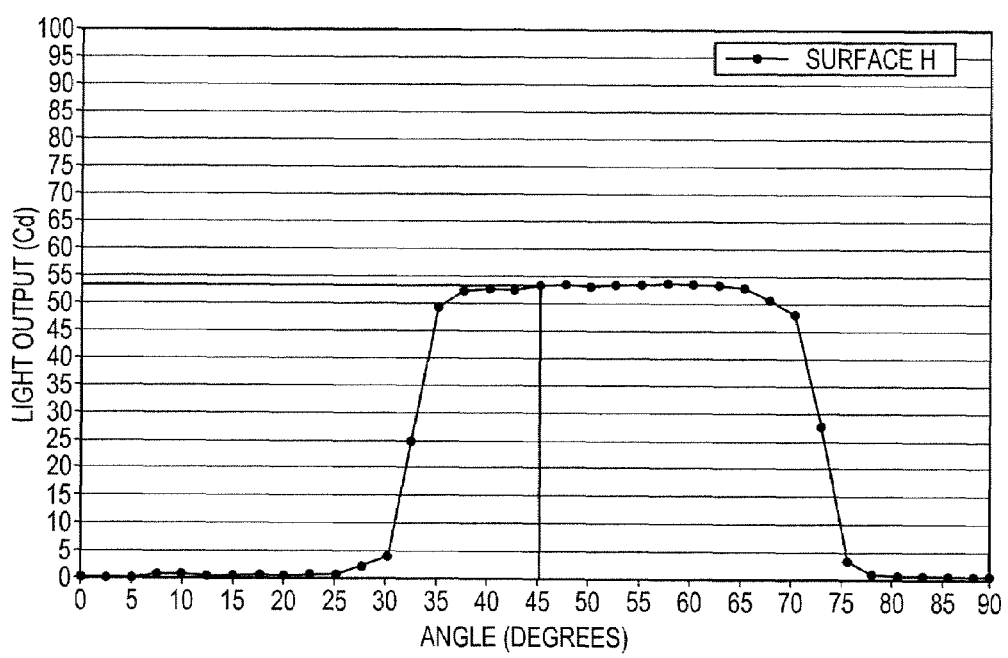
FIG. 25 is a graph illustrating light output contribution from surface H as a function of angle.

FIG. 25 illustrates light output contribution from surfaces H along planes 24, 24-1. As illustrated in FIG. 25, the contributions from surfaces H correspond to about 50 percent of the light output relative to planes 24, 24-1. The remaining fifty percent is directly contributed by the source 14 at each compound forty-five degree vector angle.

It will be understood that focal lengths as well as angles of rotation, as described above, are exemplary only and not limitations of the present invention. Further, the physical characteristics of source 14 may also be varied without departing from the spirit and scope of the invention.

As noted above, the reflector 10' collects and directs light along the respective horizontal and vertical planes 20, 22 to thereby increase candela output for system 10 beyond that provided by source 14 in the absence of reflector 10'. Such light amplification may also be varied without departing from the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

TABLE 1a

UL & ADA 15/75 Wall Requirements

| Angle | % of Rated Light Output | Candela Setting | | | |
|---|---|---|---|---|---|
| | | 15Cd | Typical 15Cd Output | 15/75Cd | Typical 15/75Cd Output |
| UL Wall Requirements-Horizontal Plane | | | | | |
| 0 | 100% | 15.0 | 55.0 | 75.0 | 93.5 |
| 5 | 90% | 13.5 | 36.8 | 13.5 | 62.6 |
| 10 | 90% | 13.5 | 23.6 | 13.5 | 40.2 |
| 15 | 90% | 13.5 | 18.1 | 13.5 | 30.8 |
| 20 | 90% | 13.5 | 16.6 | 13.5 | 28.2 |
| 25 | 90% | 13.5 | 17.3 | 13.5 | 29.4 |
| 30 | 75% | 11.3 | 15.7 | 11.3 | 26.7 |
| 35 | 75% | 11.3 | 16.6 | 11.3 | 28.2 |
| 40 | 75% | 11.3 | 17.9 | 11.3 | 30.5 |
| 45 | 75% | 11.3 | 17.9 | 11.3 | 30.4 |
| 50 | 55% | 8.3 | 16.9 | 8.3 | 28.7 |
| 55 | 45% | 6.8 | 15.9 | 6.8 | 27.0 |
| 60 | 40% | 6.0 | 14.9 | 6.0 | 25.3 |
| 65 | 35% | 5.3 | 13.0 | 5.3 | 22.1 |
| 70 | 35% | 5.3 | 10.8 | 5.3 | 18.4 |
| 75 | 30% | 4.5 | 8.4 | 4.5 | 14.3 |
| 80 | 30% | 4.5 | 7.4 | 4.5 | 12.7 |
| 85 | 25% | 3.8 | 7.2 | 3.8 | 12.3 |
| 90 | 25% | 3.8 | 5.3 | 3.8 | 9.0 |
| UL Wall Requirements-Vertical Plane | | | | | |
| 0 | 100% | 15.0 | 55.0 | 75.0 | 93.5 |
| 5 | 90% | 13.5 | 36.8 | 13.5 | 62.6 |
| 10 | 90% | 13.5 | 23.6 | 13.5 | 40.2 |
| 15 | 90% | 13.5 | 18.1 | 13.5 | 30.8 |
| 20 | 90% | 13.5 | 16.6 | 13.5 | 28.2 |
| 25 | 90% | 13.5 | 17.3 | 13.5 | 29.4 |
| 30 | 90% | 13.5 | 15.7 | 13.5 | 26.7 |
| 35 | 65% | 9.8 | 16.6 | 9.8 | 28.2 |
| 40 | 46% | 6.9 | 17.9 | 6.9 | 30.5 |
| 45 | 34% | 5.1 | 17.9 | 5.1 | 30.4 |
| 50 | 27% | 4.1 | 16.9 | 4.1 | 28.7 |
| 55 | 22% | 3.3 | 15.9 | 3.3 | 27.0 |
| 60 | 18% | 2.7 | 14.9 | 2.7 | 25.3 |

TABLE 1a-continued

UL & ADA 15/75 Wall Requirements

| Angle | % of Rated Light Output | Candela Setting | | | |
|---|---|---|---|---|---|
| | | 15Cd | Typical 15Cd Output | 15/75Cd | Typical 15/75Cd Output |
| 65 | 16% | 2.4 | 13.0 | 2.4 | 22.1 |
| 70 | 15% | 2.3 | 10.8 | 2.3 | 18.4 |
| 75 | 13% | 2.0 | 8.4 | 2.0 | 14.3 |
| 80 | 12% | 1.8 | 7.4 | 1.8 | 12.7 |
| 85 | 12% | 1.8 | 7.2 | 1.8 | 12.3 |
| 90 | 12% | 1.8 | 5.3 | 1.8 | 9.0 |

TABLE 1b

UL & ADA 15/75 Ceiling Requirements

| Angle | % of Rated Light Output | Candela Setting | | | |
|---|---|---|---|---|---|
| | | 15Cd | Typical 15Cd Output | 15/75Cd | Typical 15/75Cd Output |
| UL Ceiling Requirements-Horizontal Plane | | | | | |
| 0 | 100% | 15.0 | 55.0 | 75.0 | 93.5 |
| 5 | 90% | 13.5 | 36.8 | 13.5 | 62.6 |
| 10 | 90% | 13.5 | 23.6 | 13.5 | 40.2 |
| 15 | 90% | 13.5 | 18.1 | 13.5 | 30.8 |
| 20 | 90% | 13.5 | 16.6 | 13.5 | 28.2 |
| 25 | 90% | 13.5 | 17.3 | 13.5 | 29.4 |
| 30 | 75% | 11.3 | 15.7 | 11.3 | 26.7 |
| 35 | 75% | 11.3 | 16.6 | 11.3 | 28.2 |
| 40 | 75% | 11.3 | 17.9 | 11.3 | 30.5 |
| 45 | 75% | 11.3 | 17.9 | 11.3 | 30.4 |
| 50 | 55% | 8.3 | 16.9 | 8.3 | 28.7 |
| 55 | 45% | 6.8 | 15.9 | 6.8 | 27.0 |
| 60 | 40% | 6.0 | 14.9 | 6.0 | 25.3 |
| 65 | 35% | 5.3 | 13.0 | 5.3 | 22.1 |
| 70 | 35% | 5.3 | 10.8 | 5.3 | 18.4 |
| 75 | 30% | 4.5 | 8.4 | 4.5 | 14.3 |
| 80 | 30% | 4.5 | 7.4 | 4.5 | 12.7 |
| 85 | 25% | 3.8 | 7.2 | 3.8 | 12.3 |
| 90 | 25% | 3.8 | 5.3 | 3.8 | 9.0 |
| UL Ceiling Requirements-Vertical Plane | | | | | |
| 0 | 100% | 15.0 | 55.0 | 75.0 | 93.5 |
| 5 | 90% | 13.5 | 36.8 | 13.5 | 62.6 |
| 10 | 90% | 13.5 | 23.6 | 13.5 | 40.2 |
| 15 | 90% | 13.5 | 18.1 | 13.5 | 30.8 |
| 20 | 90% | 13.5 | 16.6 | 13.5 | 28.2 |
| 25 | 90% | 13.5 | 17.3 | 13.5 | 29.4 |
| 30 | 75% | 11.3 | 15.7 | 11.3 | 26.7 |
| 35 | 75% | 11.3 | 16.6 | 11.3 | 28.2 |
| 40 | 75% | 11.3 | 17.9 | 11.3 | 30.5 |
| 45 | 75% | 11.3 | 17.9 | 11.3 | 30.4 |
| 50 | 55% | 8.3 | 16.9 | 8.3 | 28.7 |
| 55 | 45% | 6.8 | 15.9 | 6.8 | 27.0 |
| 60 | 40% | 6.0 | 14.9 | 6.0 | 25.3 |
| 65 | 35% | 5.3 | 13.0 | 5.3 | 22.1 |
| 70 | 35% | 5.3 | 10.8 | 5.3 | 18.4 |
| 75 | 30% | 4.5 | 8.4 | 4.5 | 14.3 |
| 80 | 30% | 4.5 | 7.4 | 4.5 | 12.7 |
| 85 | 25% | 3.8 | 7.2 | 3.8 | 12.3 |
| 90 | 25% | 3.8 | 5.3 | 3.8 | 9.0 |

TABLE 2

Surface Contribution Per Quadrant (not including direct rays from bulb)

| | % Contribution By Surface | | | | | | |
|---|---|---|---|---|---|---|---|
| Angle | Surface A | Surface B | Surface C | Surface D | Surface E | Surface F | Surface G |
| 0 | 61% | 26% | 10% | 3% | | | |
| 5 | 54% | 32% | 11% | 2% | | | |
| 10 | 32% | 44% | 18% | 5% | 1% | | |
| 15 | 19% | 40% | 28% | 10% | 3% | | |
| 20 | 11% | 22% | 38% | 18% | 11% | | |
| 25 | 5% | 11% | 32% | 27% | 25% | | |
| 30 | 1% | 4% | 20% | 35% | 41% | | |
| 35 | | 1% | 10% | 33% | 49% | | 7% |
| 40 | | | 6% | 21% | 51% | | 22% |
| 45 | | | 1% | 11% | 52% | | 36% |
| 50 | | | 1% | 6% | 52% | | 42% |
| 55 | | | | 2% | 44% | 8% | 46% |
| 60 | | | | | 24% | 30% | 46% |
| 65 | | | | | 8% | 51% | 41% |
| 70 | | | | | 1% | 68% | 31% |
| 75 | | | | | | 90% | 10% |
| 80 | | | | | | 100% | |
| 85 | | | | | | 100% | |
| 90 | | | | | | 100% | |

What is claimed is:

1. A modular reflector comprising a plurality of substantially identical modular sections, the sections are arranged symmetrically about a common axis, each of the sections including;
   a first, proximal section defined by a parabolic surface with an axis of revolution rotated a first angle relative to the common axis;
   a second section stacked on the first section, the second section defined by a parabolic surface with an axis of revolution rotated a second angle relative to the common axis, the second angle having a greater value than the first angle;
   a third section stacked in the second section, the third section defined by a parabolic surface with an axis of revolution rotated a third angle relative to the common axis, the second angle having a lesser value than the third angle;
   with all sections arcuately oriented relative to the common axis.

2. A reflector as in claim 1 where the second section extends arcuately on the order of ninety degrees.

3. A reflector as in claim 1 which includes fourth and fifth stacked partial parabolic sections which extend axially from the third section with the forth and fifth sections extending arcuately on the order of forty-five degrees relative to the common axis.

4. A method comprising:
   emitting light in a plurality of directions relative to an axis of illumination;
   reflecting a first part of the light off of a first partial parabolic reflector symmetrically configured relative to the axis with an axis of revolution oriented at a first angle relative to the axis;
   reflecting a second part of the light off of a second partial parabolic reflector oriented with an axis of revolution oriented at a second angle relative to the axis;
   setting the second angle to a greater value than the first angle;
   reflecting a third part of the light off of a third partial parabolic reflector oriented with an axis of revolution oriented at a third angle relative to the axis; and setting the second angle to a lesser value than the third angle.

5. A method as in claim 4 where at least the second part of the light is symmetrically reflected relative to the axis of illumination.

6. A method as in claim 4 which includes extending at least the second partial parabolic reflector arcuately, relative to the axis of illumination, across a predetermined angle.

7. A method as in claim 6 where the predetermined angle is on the order of ninety degrees.

8. A method as in claim 4 which includes symmetrically reflecting light, relative to the axis of illumination, off of a plurality of second partial parabolic reflectors arranged symmetrically about the axis of illumination.

9. A method as in claim 4 which includes stacking the first, second and third partial parabolic reflectors axially relative to the axis of illumination.

10. A method as in claim 9 which includes extending the reflectors arcuately, relative to the axis of illumination, across a predetermined angle.

11. A method comprising:
defining a first parabola with a focal length relative to a first axis of revolution;
revolving the first parabola, through a predetermined angle about the first axis of revolution thereby forming a first partial parabolic surface;
truncating the first partial parabolic surface forming an end thereof;
defining a second parabola with a focal length relative to a second axis of revolution coincident with the first axis of revolution;
rotating the second axis of revolution relative to the first axis;
revolving the second parabola about the rotated second axis through a second predetermined angle thereby forming a second partial parabolic surface;
stacking the second partial parabolic surface on the end of the first partial parabolic surface;
truncating the second partial parabolic surface forming a second end thereof, the end and the second end are spaced apart axially along the first axis of revolution by the second partial parabolic surface;
defining a third parabola with a focal length relative to a third axis of revolution coincident with the first axis of revolution;
rotating the third axis of revolution relative to the first axis;
revolving the third parabola about the rotated third axis through a third predetermined angle thereby forming a third partial parabolic surface; and
stacking the third partial parabolic surface on the second end of the second partial parabolic surface.

12. A method as in claim 11 where the predetermined angle is on the order of ninety degrees.

13. A method as in claim 11 which includes replicating the truncated surfaces relative to the first axis of revolution.

14. A method as in claim 13 where replicating includes forming a multi-sided reflector that is symmetrical relative to the first axis of revolution.

15. A method as in claim 11 which includes defining another parabola with a selected focal length relative to another axis of revolution;
orienting the another axis of revolution at an angle on the order of ninety degrees relative to the first axis of revolution rotating the another parabola about the first axis of revolution through a selected angle thereby forming a partial parabolic surface, and truncating that surface; and locating the truncated surface at an end of the second partial parabolic surface.

16. A method as in claim 15 where rotating the another parabola comprises rotating through a selected angle on the order of forty-five degrees.

17. A method as in claim 15 where the selected angle falls in a range of twenty to seventy degrees.

18. A method as in claim 17 which includes replicating that truncated surface symmetrically about the first axis of revolution.

19. A method as in claim 18 where replicating includes spacing four of the truncated surfaces around the first axis of revolution.

20. A method as in claim 18 including replicating the first and second parabolic surfaces multiple times about the first axis of revolution.

21. A method as in claim 11 including replicating the first and second parabolic surfaces multiple times about the first axis of revolution.

22. A reflector comprising:
an axis of illumination about which light is emitted in a plurality of directions;
a first partial parabolic reflector symmetrically configured relative to the axis with an axis of revolution oriented at a first angle relative to the axis, the first partial parabolic reflector reflecting a first part of the light;
a second partial parabolic reflector oriented with an axis of revolution oriented at a second angle relative to the axis, the second partial parabolic reflector reflecting a second part of the light, the second angle having a greater value than the first angle; and
a third partial parabolic reflector oriented with an axis of revolution oriented at a third angle relative to the axis, the third partial parabolic reflector reflecting a third part of the light, the second angle having a lesser value than the third angle.

23. A reflector comprising:
a first partial parabolic surface, with a focal length relative to a first axis of revolution, rotated through a predetermined angle about the first axis of revolution, the first partial parabolic surface having an end;
a second partial parabolic surface, with a focal length relative to a second axis of revolution, the second axis of revolution being rotated through a second predetermined angle relative to the first axis of revolution, the second partial parabolic surface stacked on the end of the first partial parabolic surface, the second partial parabolic surface having an end;
wherein the end of the first partial parabolic surface and the end of the second partial parabolic surface arc spaced apart axially along the first axis of revolution by the second partial parabolic surface;
a third partial parabolic surface, with a focal length relative to a third axis of revolution, the third axis of revolution being rotated through a third predetermined angle relative to the first axis of revolution, the third partial parabolic surface stacked on the end of the second partial parabolic surface.

24. A reflector as in claim 23 where the second angle has a value less then the third angle.

25. A reflector as in claim 23 where the first, second, and third parabolic surfaces are spaced axially along the first axis of revolution.

26. A reflector as in claim 23 where the first, second, and third parabolic surfaces are symmetrically configured relative to the first axis of revolution.

* * * * *